US012596312B2

(12) United States Patent
Nomura et al.

(10) Patent No.: US 12,596,312 B2
(45) Date of Patent: Apr. 7, 2026

(54) TONER PROCESSING APPARATUS AND METHOD FOR PRODUCING TONER

(71) Applicant: CANON KABUSHIKI KAISHA, Tokyo (JP)

(72) Inventors: Shotaro Nomura, Shizuoka (JP); Takeshi Tsujino, Shizuoka (JP); Yasuhiro Hashimoto, Shizuoka (JP); Atsuhiko Ohmori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 783 days.

(21) Appl. No.: 17/892,610

(22) Filed: Aug. 22, 2022

(65) Prior Publication Data

US 2023/0088424 A1 Mar. 23, 2023

(30) Foreign Application Priority Data

Aug. 27, 2021 (JP) ................................ 2021-138480

(51) Int. Cl.
*G03G 9/08* (2006.01)
*G03G 15/08* (2006.01)

(52) U.S. Cl.
CPC ......... *G03G 9/081* (2013.01); *G03G 15/0889* (2013.01)

(58) Field of Classification Search
CPC ........................... G03G 9/081; G03G 15/0889
(Continued)

(56) References Cited

U.S. PATENT DOCUMENTS 583,572 A * 6/1897 Gordon et al. ....... B01F 27/071 366/326.1
2004/0213082 A1* 10/2004 Tobler ....................... F25C 5/24 366/325.4

(Continued)

FOREIGN PATENT DOCUMENTS

JP H11-57439 3/1999
JP H11-216347 8/1999

(Continued)

OTHER PUBLICATIONS

Office Action dated Apr. 1, 2025 in counterpart Japanese Application No. 2021-138480, together with English translation thereof.

*Primary Examiner* — David L Sorkin
(74) *Attorney, Agent, or Firm* — Venable LLP

(57) ABSTRACT

A toner processing apparatus processing an object comprising toner particles, comprising a processing chamber having a drive shaft rotatably provided at the bottom of chamber; a rotating member and a flow means pivotally supported by the drive shaft, wherein the rotating member comprises a main portion, and a processing portion protruding outward in the radial direction comprising a plate-shaped processing surface that collides with the object, and a rear wing coupled to the upstream side of the plate-shaped processing surface in a rotation direction; the plate-shaped processing surface protrudes upward from the rear wing; the plate-shaped processing surface away from the main portion is on the downstream side in the rotation direction of the rotating member; and where a radius of inner circumference of processing chamber is denoted by d, the shortest distance between inner wall of processing chamber and plate-shaped processing surface is 0.100d or less.

10 Claims, 5 Drawing Sheets

(58) Field of Classification Search
USPC .................................... 366/314, 329.1, 329.2
See application file for complete search history.

(56) References Cited

U.S. PATENT DOCUMENTS

| | | | | |
|---|---|---|---|---|
| 2015/0037719 | A1* | 2/2015 | Naka .................... | G03G 9/0837 430/108.1 |
| 2016/0041481 | A1 | 2/2016 | Nomura et al. ..... | G03G 9/0025 |
| 2020/0183296 | A1 | 6/2020 | Nishikawa et al. ......................... | G03G 9/09716 |
| 2022/0373902 | A1* | 11/2022 | Akabane .............. | G03G 9/0819 |
| 2023/0082471 | A1 | 3/2023 | Hashimoto et al. . | G03G 9/0808 |

FOREIGN PATENT DOCUMENTS

| | | |
|---|---|---|
| JP | H11-216348 | 8/1999 |
| JP | 2006-065015 | 3/2006 |
| JP | 2017-125916 | 7/2017 |
| JP | 2017-142320 | 8/2017 |
| JP | 2017-215519 | 12/2017 |
| JP | 2017-219561 | 12/2017 |
| JP | 2018-036596 | 3/2018 |
| JP | 2018-045004 | 3/2018 |
| JP | 2020-095080 | 6/2020 |
| JP | 2020-095081 | 6/2020 |

* cited by examiner

TONER PROCESSING APPARATUS AND METHOD FOR PRODUCING TONER

BACKGROUND OF THE INVENTION

Field of the Invention

The present disclosure relates to a toner processing apparatus for use in an electrophotographic method, an electrostatic recording method, a magnetic recording method, and the like, and to a method for producing a toner.

Description of the Related Art

In recent years, an even greater demand has been created for higher printing speed and energy saving in electrophotographic image forming apparatuses such as laser beam printers (LBPs) and copiers. Therefore, it is also necessary that toners, which are developers in the electrophotographic method, meet such a demand.

In most cases, a toner is melted by the heat supplied from a high-temperature fixing unit and fixed on the paper, but where the speed is increased, the contact time with the fixing unit tends to be shortened and the amount of heat supplied tends to be decreased. Further, due to the demand for energy saving, it is also necessary to lower the temperature of the fixing unit itself. Therefore, the toner is required to have low-temperature fixing performance such that enables melting at a lower temperature and a lower calorific value than before. Conventionally, in order to improve the low-temperature fixing performance of toner, the addition of a plasticizer to the main binder has been widely performed. The plasticizer is specifically a crystalline molecule such as a hydrocarbon wax or a crystalline resin such as a polyester.

These crystalline plasticizers generally exert a plasticizing effect in proportion to the amount added and enable the melting of the main binder at a lower temperature and a lower calorific value. However, when a large amount of the plasticizer is added with the intention of improving low-temperature fixability, adverse effects such as deterioration of heat-resistant storage stability due to aggregation of toner particles caused by leakage of crystalline plasticizer molecules to the toner particle surface during long-term storage tend to become apparent. Therefore, when a large amount of the crystalline plasticizer is added, it is necessary to form crystalline domains of the crystalline plasticizer alone inside the toner particle at the time of production to stabilize the crystalline plasticizer molecules and suppress the leakage to the toner particle surface during long-term storage.

A step of forming crystalline domains of a crystalline plasticizer alone at the time of production to improve the degree of crystallinity is generally called an annealing step, and is described in, for example, Japanese Patent Application Publication No. 2006-065015.

In the annealing step, the toner is heated to a temperature at which thermal motion between molecules is possible to some extent, without the crystalline plasticizer being melted, and allowed to stand to form energetically stable crystallized domains. However, the annealing method based on heating and allowing to stand requires a relatively long processing time, and therefore has a problem of inferior productivity.

Accordingly, instead of the annealing method based on heating and allowing to stand, Japanese Patent Application Publication No. 2017-142320 and the like proposed a method of performing annealing in a shorter time by conducting heat treatment in a stirring and mixing step, in which a mechanical impact force is applied, as a method for heat-treating the entire powder more efficiently.

SUMMARY OF THE INVENTION

However, with these conventional annealing methods, the crystalline domains of the crystalline plasticizer are monotonically grown from fine crystal nuclei formed in the early stage. For this reason, a plurality of subdomains derived from the early crystal nuclei is formed in a single domain, and it was found that the boundaries between these subdomains are broken as a crystal structure and become a factor reducing the degree of crystallinity.

The present disclosure provides a toner processing apparatus and a method for producing a toner that make it possible to perform an annealing treatment that has high productivity and can increase the degree of crystallinity of the crystalline plasticizer as compared with the conventional one, and also make it possible to improve the storage stability of the toner.

The present disclosure relates to a toner processing apparatus processing an object to be processed comprising toner particles, the toner processing apparatus comprising:

- a processing chamber having a bottom and a cylindrical inner peripheral surface in which the object to be processed is accommodated;
- a drive shaft rotatably provided at the bottom of the processing chamber;
- a rotating member pivotally supported by the drive shaft; and
- a flow means pivotally supported by the drive shaft and arranged below the rotating member in the processing chamber for causing the object to be processed to flow upward from the bottom of the processing chamber, wherein the rotating member comprises

- a rotating member main portion, and
- a processing portion protruding outward in the radial direction from an outer peripheral portion of the rotating member main portion;

the processing portion comprises

- a plate-shaped processing surface that partially or wholly collides with the object to be processed to process, and
- a rear wing coupled to the upstream side of the plate-shaped processing surface in a rotation direction;

the plate-shaped processing surface protrudes upward from the rear wing;

a region of the plate-shaped processing surface away from the rotating member main portion is located on the downstream side in the rotation direction of the rotating member compared to a region close to the rotating member main portion; and where a radius of an inner circumference of the processing chamber is denoted by d, the shortest distance between an inner wall of the processing chamber and the plate-shaped processing surface is 0.100d or less.

According to the present disclosure, it is possible to provide a toner processing apparatus that makes it possible to perform an annealing treatment that has high productivity and can increase the degree of crystallinity of the crystalline plasticizer as compared with the conventional one, and also makes it possible to improve the storage stability of the toner.

Further features of the present invention will become apparent from the following description of exemplary embodiments with reference to the attached drawings.

DESCRIPTION OF THE EMBODIMENTS

Figure 1:
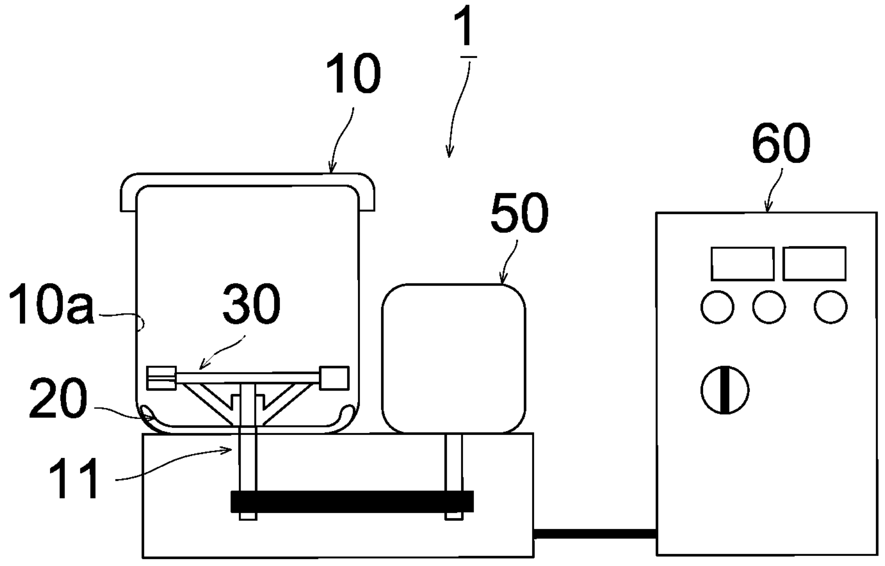
FIG. 1 is a schematic view of a toner processing apparatus.

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined.

The present disclosure relates to a toner processing apparatus processing an object to be processed comprising toner particles, the toner processing apparatus comprising:

a processing chamber having a bottom and a cylindrical inner peripheral surface in which the object to be processed is accommodated;

a drive shaft rotatably provided at the bottom of the processing chamber;

a rotating member pivotally supported by the drive shaft; and a flow means pivotally supported by the drive shaft and arranged below the rotating member in the processing chamber for causing the object to be processed to flow upward from the bottom of the processing chamber, wherein the rotating member comprises a rotating member main portion, and a processing portion protruding outward in the radial direction from an outer peripheral portion of the rotating member main portion;

the processing portion comprises a plate-shaped processing surface that partially or wholly collides with the object to be processed to process, and a rear wing coupled to the upstream side of the plate-shaped processing surface in a rotation direction;

the plate-shaped processing surface protrudes upward from the rear wing;

a region of the plate-shaped processing surface away from the rotating member main portion is located on the downstream side in the rotation direction of the rotating member compared to a region close to the rotating member main portion; and where a radius of an inner circumference of the processing chamber is denoted by d, the shortest distance between an inner wall of the processing chamber and the plate-shaped processing surface is 0.100d or less.

According to the study by the present inventors, the toner processing apparatus makes it possible to provide a toner having a higher degree of crystallinity of the crystalline plasticizer than the conventional one. The details will be described below.

Generally, in the toner production step, the crystalline plasticizer is completely melted with the binder resin in a high-temperature state, and then solidified in a state in which the binder resin is plasticized in the process of returning to normal temperature.

After that, crystalline domains in which the crystalline plasticizer is aggregated are formed by keeping at the temperature at which the crystalline plasticizer molecules can thermally move, while maintaining the solid state of the binder resin, or by moving the crystalline plasticizer molecules by physical high-pressure/vibration processing. A step of growing the crystalline domains and increasing the degree of crystallinity is called an annealing step.

Generally, in the case of realizing the thermal motion, the annealing step is a step of maintaining the object at a constant temperature, and in this step, the crystals continue to grow monotonically. In the crystal growth process, first, the molten crystalline plasticizer molecules crystallize to generate crystal nuclei, and then the molten crystalline plasticizer gathers and grows on the existing crystal nuclei. Further, the crystal nuclei grow to become subdomains, and a plurality of subdomains coalesce to form the final crystalline domains.

In the case of a general annealing step, since the initially generated crystal nuclei grow as they are, a subdomain structure derived from the initially generated crystal nuclei remains as it is inside the final crystalline domain. In most cases, the phases of the arrangement of the crystalline plasticizer molecules differ between these subdomains, resulting in a discontinuous state of the crystals. Therefore, the subdomain structure becomes a factor that hinders the increase in the degree of crystallinity.

In order to suppress the formation of such subdomains, make the entire domain as a uniform crystalline domain and improve the crystallinity, it is necessary to repeat crystal growth and partial melting and coalesce the subdomains instead of growing the crystals monotonically. For that purpose, a method of periodic temperature processing in which the temperature is repeatedly raised and lowered can be considered instead of maintain the temperature condition of the annealing step at a constant temperature. In the case of physical high-pressure/vibration processing, intermittent processing can be considered.

The results of studies by the present inventors made it clear that the above-mentioned toner processing apparatus enables desired processing.

Hereinbelow, an embodiment of the present disclosure will be described in detail by way of example with reference to the drawings. However, the dimensions, materials, shapes, and relative arrangements of the components described in the embodiment should be changed, as appropriate, depending on the configuration of the apparatus to which the invention is applied and various conditions, and the scope of the present invention is not intended to be limited to the following embodiment.

The toner processing apparatus comprises a processing chamber in which an object to be processed is accommodated and which has a bottom and a cylindrical inner peripheral surface; a drive shaft rotatably provided at the bottom of the processing chamber; a rotating member that is pivotally supported by the drive shaft in the processing chamber and provided to be rotatable around the drive shaft; and a flow means for causing the object to be processed to flow upward from the bottom of the processing chamber, the flow means being pivotally supported by the drive shaft and arranged below the rotating member in the processing chamber.

FIG. 1 shows a schematic view of a toner processing apparatus 1.

The toner processing apparatus 1 is configured of a processing chamber (processing tank) 10 in which an object to be processed is accommodated and which has a bottom and a cylindrical inner peripheral surface, a flow means 20 for causing the object to be processed to flow upward from the bottom of the processing chamber 10, a rotating member 30, a drive motor 50, and a control unit 60. Here, the processing chamber 10 is for accommodating the object to be processed that includes toner particles. The flow means 20 is pivotally supported by the drive shaft 11 and is rotatably provided at the bottom of the processing chamber 10 below the rotating member 30 in the processing chamber. Further, the rotating member 30 is pivotally supported by the drive shaft 11 and is rotatably provided above the flow means 20.

Figure 2:
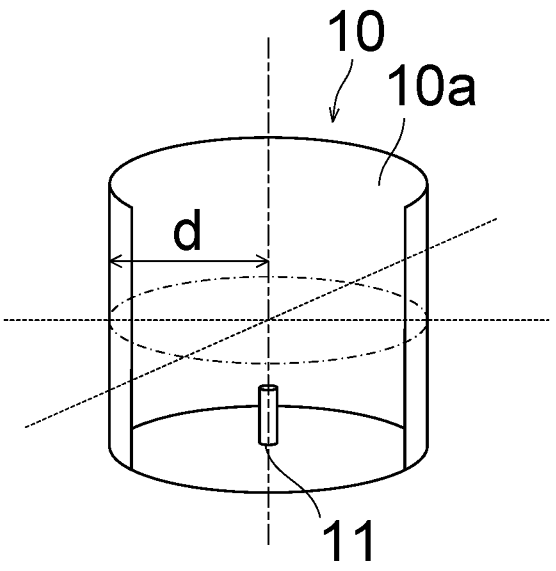
FIG. 2 is a schematic view of a processing chamber.

FIG. 2 shows a schematic view of the processing chamber 10. FIG. 2 shows a state in which the inner peripheral surface (inner wall) 10*a* of the processing chamber 10 is partially cut for convenience of explanation. The processing chamber 10 is a cylindrical container having a substantially flat bottom, and is equipped with a rotatably provided drive shaft 11 for attaching the flow means 20 and the rotating member 30 at the center of the bottom. From the viewpoint of strength, the processing chamber 10 is preferably made of a metal such as iron or SUS, and the inner surface is preferably made of a conductive material or processed to be conductive. Here, d is the radius of the inner circumference of the processing chamber 10.

The radius d can be designed, as appropriate, according to the amount of the object to be processed and is not particularly limited, but is preferably, for example, about from 50 to 1000 mm. Similarly, the capacity of the processing chamber 10 may be appropriately designed, as appropriate, according to the amount of the object to be processed, and is preferably, for example, about from 3 L to 500 L.

Figure 3A:
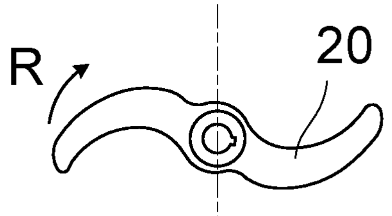
FIGS. 3A and 3B are schematic views of a flow means.
Figure 3B:
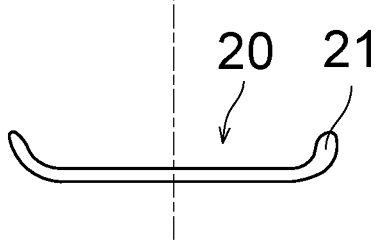

FIGS. 3A and 3B show schematic views of the flow means 20 that causes the object to be processed to flow upward from the bottom of the processing chamber, the flow means being pivotally supported by the drive shaft and arranged below the rotating member. FIG. 3A is a top view, and FIG. 3B is a side view. The flow means 20 is configured to be able to cause the object to be processed that includes the toner particles to flow upward from the bottom of the processing chamber and to be whirled up in the processing chamber 10 by rotating. The flow means 20 has a blade portion 21 extending outward (outward in the radial direction (radially outward direction), radially outer side) from the center of rotation, and the blade portion 21 has flip-up tips for causing the object to be processed to be whirled up.

The shape of the blade portion 21 can be designed, as appropriate, according to the size and operating conditions of the toner processing apparatus 1 and the filling amount and the specific gravity of the object to be processed. The flow means 20 is preferably made of a metal such as iron or SUS from the viewpoint of strength, and may be plated or coated for wear resistance if necessary. The flow means 20 is fixed to the drive shaft 11 at the bottom of the processing chamber 10 and rotates clockwise (as shown in FIG. 3A) when viewed from above. In the figure, the rotation direction of the drive shaft 11 is indicated by an arrow R. Due to the rotation of the flow means 20, the object to be processed rises in the processing chamber 10 while rotating in the same direction as the flow means 20, and then descends due to gravity. In this way, the object to be processed is uniformly mixed.

Figure 4A:
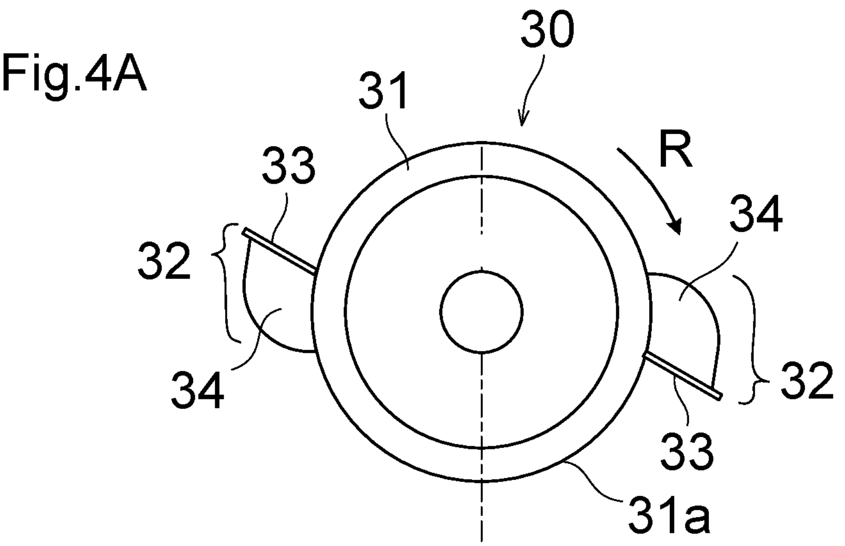
FIGS. 4A and 4B are schematic views of a rotating member.
Figure 4B:
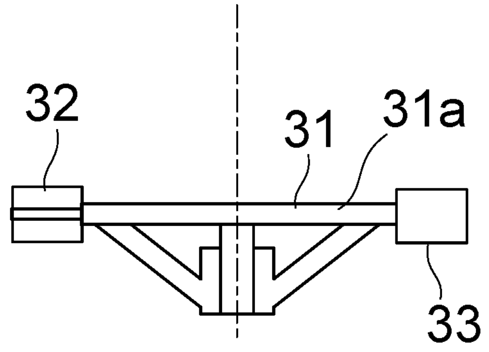

FIGS. 4A and 4B are schematic views of the rotating member 30. FIG. 4A is a top view, and FIG. 4B is a side view.

The rotating member 30 is pivotally supported by the same drive shaft 11 as the flow means 20 above the flow means 20 in the processing chamber 10 and rotates in the same direction as the flow means 20 (arrow R direction). The rotating member 30 is configured of a rotating member main portion 31 and a processing portion 32 provided with a plate-shaped processing surface 33 that collides with the object to be processed and processes the object to be processed as the rotating member 30 rotates. Reference numeral 31*a* is an outer peripheral portion of the rotating member main portion.

The rotating member 30 has a rotating member main portion 31 and a processing portion 32 protruding outward in the radial direction from the outer peripheral portion 31*a* of the rotating member main portion 31, and the processing portion 32 has a plate-shaped processing surface 33 that partially or wholly collides with the object to be processed to process the object to be processed, and a rear wing 34 coupled to the upstream side of the plate-shaped processing surface 33 in the rotation direction. The number of processing portions 32 in the rotating member 30 is not particularly limited, and is preferably from 2 to 8, more preferably from 2 to 4, and even more preferably 2. It is preferable that the processing portions 32 be provided on the outer peripheral portion 31*a* of the rotating member main portion 31 at equal intervals.

The plate-shaped processing surface 33 is formed of, for example, a plate-shaped member provided so as to protrude outward in the radial direction from the outer peripheral portion of the rotating member main portion 31. The shape of the plate-shaped processing surface 33 is not particularly limited. As will be described hereinbelow, from the viewpoint of facilitating rubbing of toner unevenly distributed in the vicinity of the inner wall 35 of the processing chamber, it is preferable that the end portion of the plate-shaped processing surface 33 on the inner wall 35 side of the processing chamber have a parallel shape in the axial direction of the drive shaft 11. Suitable examples include quadrangular shapes such as a rectangular shape including a square shape, a trapezoidal shape, a parallel quadrilateral shape, a rhombus shape, and the like. A rectangular shape as shown in FIGS. 4A and 4B is preferable. Here, the rectangular shape also includes a substantially rectangular shape in which a part of the rectangle is cut out or the corners and sides are rounded. The plate-shaped processing surface 33 is preferably flat but may be also convexly or concavely rounded to the extent that the effects of the present disclosure are not impaired.

The plate-shaped member forming the plate-shaped processing surface 33 is preferably made of metal such as iron or SUS from the viewpoint of strength and may be plated or coated for wear resistance if necessary.

Figure 5A:
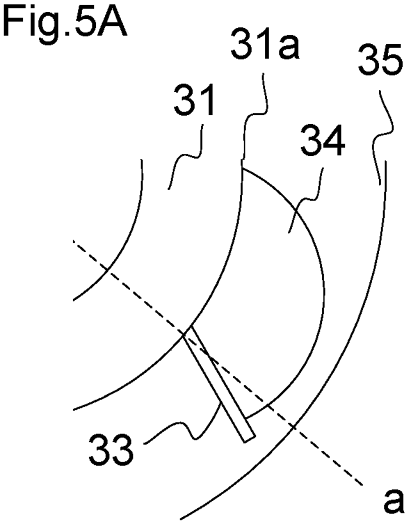
FIGS. 5A to 5D are schematic views of a processing portion.
Figure 5B:
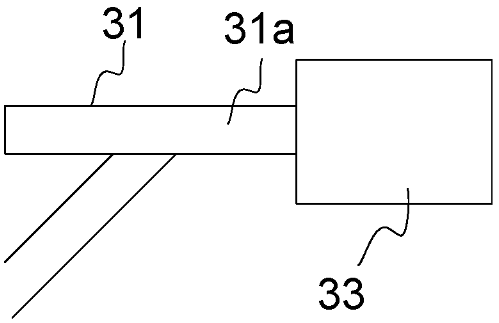
Figure 5C:
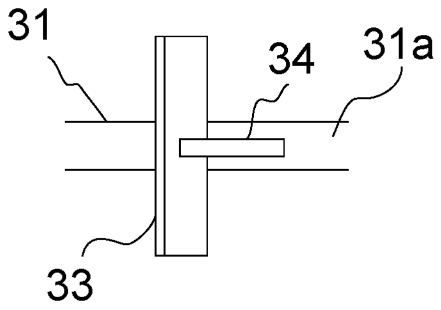
Figure 5D:
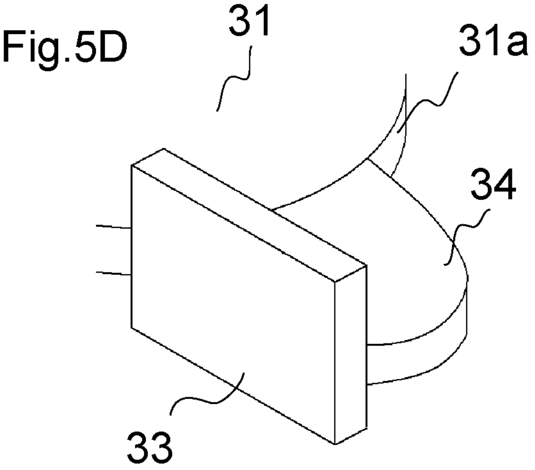

FIGS. 5A to 5D are schematic views of the processing portion 32. FIG. 5A is a top view of the processing portion 32, and FIG. 5B is a front view of the processing portion 32 as viewed from the downstream side in the rotation direction. Reference numeral 35 stands for an inner wall of the processing chamber. FIG. 5C shows a side surface seen from the horizontal direction with respect to a straight line a, the straight line a being drawn to pass through the drive shaft 11 and the point where the plate-shaped processing surface 33 is in contact with the outer peripheral portion 31*a* of the rotating member main portion 31. FIG. 5D is a perspective view of the processing portion 32.

Figure 6A:
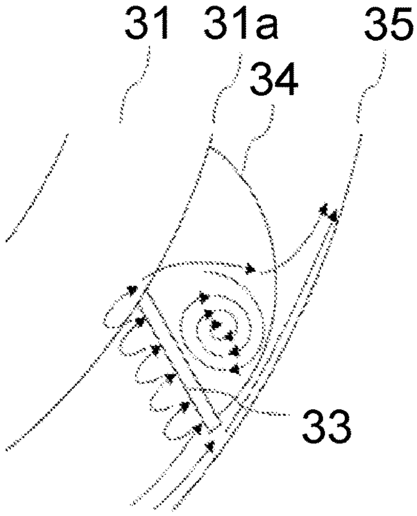
FIGS. 6A to 6C are diagrams explaining the function of the processing portion.
Figure 6B:
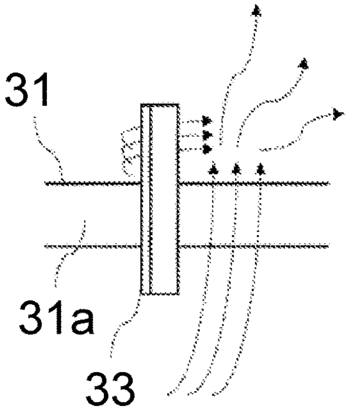
Figure 6C:
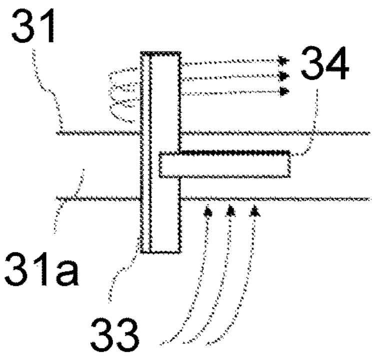

FIGS. 6A to 6C are diagrams explaining the function of the processing portion 32.

Where the plate-shaped processing surface 33 is considered as a center, a part of the airflow coming from the downstream side in the rotation direction, as shown in FIG. 6A, collides with the plate-shaped processing surface 33 and then wraps around to the rear of the plate to become a detour flow blown toward the inner wall of the processing chamber. Further, a part thereof becomes a vortex on the back surface of the plate-shaped processing surface 33.

Where the rear wing 34 is not provided, as shown in FIG. 6B, the detour flow collides with the ascending flow generated by the upward flow means 20 present below the rotating member and diffuses, and the directivity thereof cannot be maintained and no vortex is formed. However, by shielding the ascending flow generated by the upward flow means 20 with the rear wing 34, as shown in FIG. 6C, it is possible to maintain the detour flow and form the vortex flow.

As a result, after the toner carried by the airflow coming from the downstream side in the rotation direction is subjected to physical high-pressure/vibration processing by the plate-shaped processing surface 33, the toner can be unevenly distributed near the inner wall 35 of the processing chamber by the detour flow. This action enables the processing between the processing chamber wall and the tip of the plate-shaped processing surface 33, which will be described hereinbelow. Further, the vortex flow can cool the heat accumulated due to the collision between the plate-shaped processing surface 33 and the toner.

In the case where the detour flow is not generated and it is difficult to unevenly distribute the toner near the surface of the inner wall 35 of the processing chamber, it is difficult to perform the processing in the gap region between the inner wall 35 of the processing chamber and the plate-shaped processing surface 33, which will be described hereinbelow. Further, where the plate-shaped processing surface 33 cannot be cooled by the vortex flow, the temperature of the plate-shaped processing surface 33 rises to or above the melting point of the crystalline plasticizer, and crystallization may not be possible.

The plate-shaped processing surface 33 has a structure protruding upward from the rear wing 34. With such a structure, it is possible to reach the inner wall 35 of the processing chamber without blocking the traveling direction of the detour flow that wraps around to the rear of the plate-shaped processing surface 33.

Figure 7A:
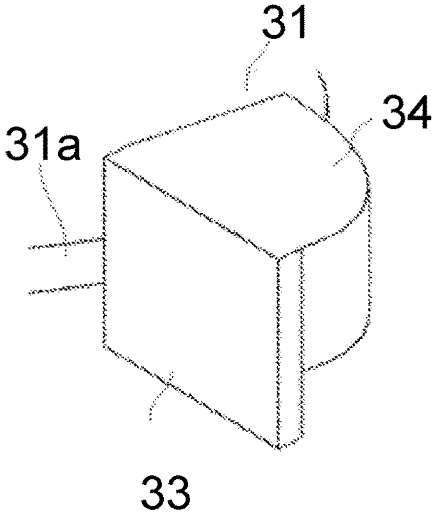
FIGS. 7A and 7B are an example of a rear wing continuous with a plate-shaped processing surface.
Figure 7B:
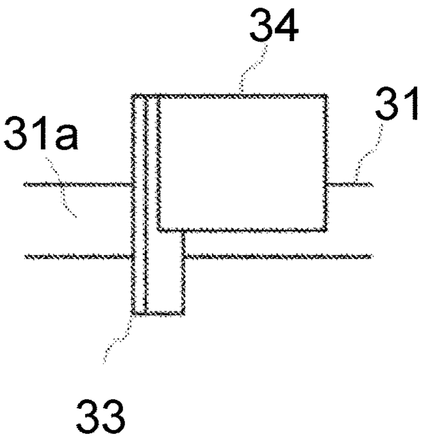

As shown in the perspective view of FIG. 7A and the side view of FIG. 7B, when the rear wing 34 does not protrude above the plate-shaped processing surface 33 and is continuous with the upper end, the toner carried by the airflow coming from the downstream side in the rotation direction rubs the upper surface of the rear wing 34, the temperature of the rear wing 34 and the plate-shaped processing surface 33 rises due to the resulting friction heat, and the colliding toner is melted and fused.

By contrast, as a result of the plate-shaped processing surface 33 protruding above the rear wing 34, the upper surface of the rear wing 34 is prevented from being rubbed by the powder flow, the toner that collides with the plate-shaped processing surface 33 is neither melted nor fused, and physical high-pressure/vibration processing can be added.

A region of the plate-shaped processing surface 33 away from the rotating member main portion 31 is located on the downstream side in the rotation direction of the rotating member 30 compared to a region that is closer to the rotating member main portion 31.

Figure 8A:
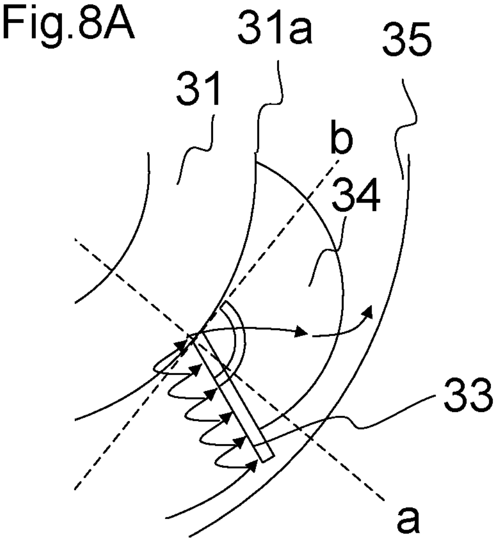
FIGS. 8A and 8B are diagrams explaining the positional relationship of the plate-shaped processing surface.
Figure 8B:
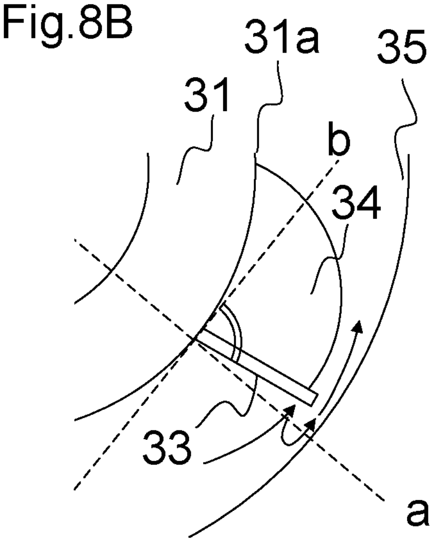

It is considered that due to such a positional relationship, the toner swirling in the processing chamber 10 can be hit once by the plate-shaped processing surface 33, and then the toner can be repelled into the passing region of the plate-shaped processing surface 33. Specifically, as shown in FIG. 8A, since the particles are repeatedly hit and moved inward in the radial direction, the toner can be repeatedly processed by the plate-shaped processing surface 33. This makes it possible to perform intermittent hitting processing many times, thereby vibrating the crystalline plasticizer molecules and promoting crystal growth.

Where the region of the plate-shaped processing surface 33 away from the rotating member main portion 31 is located on the upstream side in the rotation direction of the rotating member 30 compared to the region that is closer to the rotating member main portion 31, the direction in which the toner is repelled is the direction of the inner wall 35 of the processing chamber. Therefore, as shown in FIG. 8B, the toner leaks from the gap between the end portion of the plate-shaped processing surface 33 and the wall surface, and it becomes difficult to efficiently perform the intermittent hitting processing.

Where the radius of the inner circumference of the processing chamber is denoted by d, the shortest distance between the inner wall 35 of the processing chamber and the plate-shaped processing surface 33 is 0.100d or less. As a result, the toner unevenly distributed in the vicinity of the inner wall 35 of the processing chamber by the detour flow is rubbed in the gap region between the inner wall 35 of the processing chamber and the plate-shaped processing surface 33, and the heat from the inner wall 35 of the processing chamber can be efficiently transferred to the toner. As a consequence, the boundary surfaces of the subdomains of the crystalline plasticizer growing due to the physical impact processing are melted and the subdomains coalesce.

Where the shortest distance between the inner wall 35 of the processing chamber and the plate-shaped processing surface 33 is larger than 0.100d, the toner unevenly distributed in the vicinity of the inner wall 35 of the processing chamber cannot be rubbed, and the heat from the inner wall of the processing chamber is unlikely to be sufficiently transferred to the toner. As a result, it becomes difficult to melt and coalesce the subdomains of the crystalline plasticizer growing due to the physical impact processing.

Figure 9:
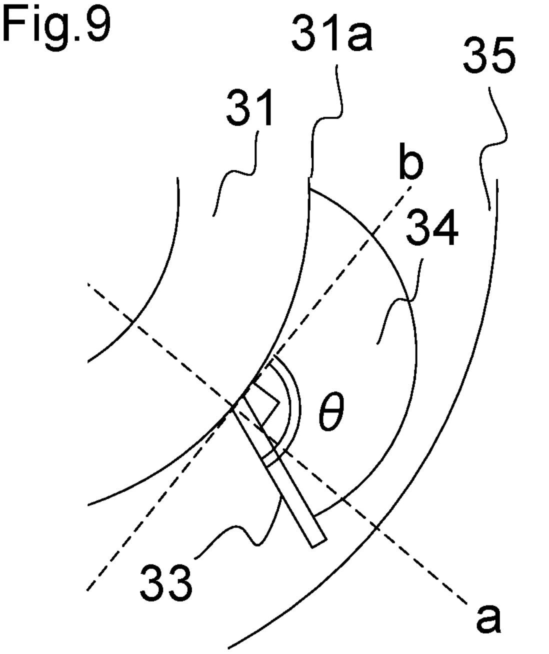
FIG. 9 is a diagram explaining the angle of the plate-shaped processing surface.

The degree to which the region of the plate-shaped processing surface 33 away from the rotating member main portion 31 is located on the downstream side in the rotation direction of the rotating member 30 with respect to the region that is closer to the rotating member main portion 31 than the aforementioned region is quantified by the angle θ shown in FIG. 9. The straight line a is a straight line passing through the drive shaft 11 and a point where the plate-shaped processing surface 33 is in contact with the outer peripheral portion 31*a* of the rotating member main portion. The straight line b is a straight line that passes through a point where the plate-shaped processing surface 33 is in contact with the outer peripheral portion 31*a* of the rotating member main portion and perpendicular to the straight line a. At this time, the angle formed by the straight line b and the plate-shaped processing surface 33 is defined as θ.

The angle θ is preferably larger than 90° and not more than 130°. Within this range, the hitting processing can be effectively performed. θ is more preferably from 95 to 120°, further preferably from 97 to 110°, and even more preferably from 98 to 105°. Within this range, the hitting processing can be performed more effectively.

The shortest distance between the inner wall 35 of the processing chamber and the plate-shaped processing surface 33 is preferably from 0.030d to 0.080d, and more preferably from 0.035d to 0.070d. Within these ranges, the toner unevenly distributed in the vicinity of the processing chamber wall can be rubbed more effectively.

These features of the toner processing apparatus as a whole exert the following effects.

The toner lifted by the flow means 20 is subjected to intermittent hitting processing by the plate-shaped processing surface 33 in which the region away from the rotating member main portion 31 is located on the downstream side in the rotation direction of the rotating member 30 compared to the region that is closer to the rotating member main portion 31. The toner is then carried to the back surface of the plate-shaped processing surface 33 by the detour flow and is unevenly distributed on the wall surface of the processing chamber. Then, the toner is heat-processed in the gap region between the plate-shaped processing surface 33 and the inner wall 35 of the processing chamber. By repeating this process, the crystalline plasticizer molecules in the toner are continuously subjected to periodic heat treatment and intermittent hitting processing, the boundaries between subdomains are melted and reduced, and a high degree of crystallinity can be achieved.

It is preferable that the rear wing 34 have a shape having a curvature protruding toward the inner wall of the processing chamber. As a result, the ascending air flow that collides with the detour flow is blocked more effectively. Where the radius of the inner circumference of the processing chamber is denoted by d, the maximum area of the rear wing 34 in the direction perpendicular to the drive shaft 11 is preferably from $0.007d^2$ to $0.312d^2$, more preferably from $0.010d^2$ to $0.220d^2$, even more preferably from $0.040d^2$ to $0.150d^2$, and still more preferably from $0.050d^2$ to $0.100d^2$. The above ranges are preferable because the ascending flow colliding with the detour flow can be blocked effectively.

Where the radius of the inner circumference of the processing chamber is denoted by d, the upward protrusion length of the plate-shaped processing surface 33 from the rear wing 34 is preferably 0.043d or more, more preferably from 0.045d to 0.220d, further preferably from 0.070d to 0.200d, and even more preferably from 0.075d to 0.180d. Within these ranges, it is possible to further promote the uneven distribution of the toner on the inner wall 35 due to the detour flow while suppressing the temperature rise of the plate-shaped processing surface 33.

Where the radius of the inner circumference of the processing chamber is denoted by d, the length of the plate-shaped processing surface 33 in the direction perpendicular to the axial direction of the drive shaft 11 of the rotating member 30 is preferably from 0.10d to 0.50d. Within this range, the physical impact processing by the plate-shaped processing surface can be efficiently applied to the entire toner while exhibiting the effect of uneven distribution on the wall surface due to the detour flow. The length of the plate-shaped processing surface 33 in the direction perpendicular to the drive shaft 11 of the rotating member 30 is more preferably from 0.20d to 0.40d, and further preferably from 0.25d to 0.35d. Within this range, the degree of crystallinity is further improved.

Where the radius of the inner circumference of the processing chamber is denoted by d, a portion (preferably, the end on the inner wall side of the processing chamber) of the plate-shaped processing surface 33 farthest from the rotating member main portion 31 preferably has a length in the axial direction of the drive shaft 11 of the rotating member 30 of from 0.10d to 0.40d. Within this range, the heat treatment in the gap region between the inner wall 35 of the processing chamber and the plate-shaped processing surface 33 can be performed more appropriately, so that the degree of crystallinity is likely to be further improved. The length is more preferably from 0.15d to 0.35d. Within this range, the heat treatment can be performed at a more suitable ratio with respect to the entire toner.

An example of a method for producing a toner by using the toner processing apparatus will be described hereinbelow.

A method for producing toner particles is not particularly limited, and known production methods such as a pulverization method, a suspension polymerization method, a dissolution suspension method, an emulsion aggregation method, and a dispersion polymerization method can be used.

In the suspension polymerization method, a toner composition comprising a polymerizable monomer that produces a binder resin, a crystalline plasticizer, and, if necessary, a polymerization initiator, a colorant, a release agent, and the like is added under stirring to an aqueous phase comprising a dispersion stabilizer, oil droplets are formed, and the temperature is thereafter raised to carry out a polymerization reaction, thereby obtaining toner particles.

Further, in the emulsification and aggregation method, fine particles obtained by emulsifying and dispersing a resin component such as a binder resin in an aqueous phase and then removing the solvent, and fine particles obtained by dispersing each of a crystalline plasticizer, a colorant, a release agent (wax), and the like in an aqueous phase are aggregated, heated and melted, thereby obtaining toner particles.

The toner production method preferably includes a step of obtaining toner particles by a pulverization method. In the pulverization method, toner particles are generally obtained through the following steps.

A binder resin, a crystalline plasticizer, and if necessary, other additives such as a colorant are mixed with a mixer such as a Henschel mixer or a ball mill.

The obtained mixture is melt-kneaded using a heat kneader such as a twin-screw kneading extruder, heating rolls, a kneader, or an extruder to obtain a melt-kneaded product.

The obtained melt-kneaded product is cooled and solidified, and then pulverized to obtain a pulverized product.

The obtained pulverized product is classified to obtain toner particles.

Further, in order to control the shape and surface properties of the toner particles, surface processing may be carried out using a surface modification device after pulverization or classification.

Examples of the mixer include the following. FM mixer (manufactured by Nippon Coke Industries Co., Ltd.); SUPER MIXER (manufactured by Kawata Mfg. Co., Ltd.); RIBOCONE (manufactured by Okawara Mfg. Co., Ltd.); NAUTA mixer, TURBULIZER, CYCLOMIX (manufactured by Hosokawa Micron Corporation); SPIRAL PIN MIXER (manufactured by Pacific Machinery & Engineering Co., Ltd.); Loedige Mixer (manufactured by Matsubo Corporation).

Examples of the heat kneader include the following. KRC kneader (manufactured by Kurimoto, Ltd.); Buss Co-kneader (manufactured by Buss AG); TEM type extruder (manufactured by Toshiba Machinery Co., Ltd.); TEX twin-screw kneader (manufactured by The Japan Steel Works, Ltd.); PCM kneader (manufactured by Ikegai Co., Ltd.); three-roll mill, mixing roll mill, kneader (Inoue Mfg. Inc.); KNEEDEX (Mitsui Mine Co., Ltd.); MS type pressurized kneader, KNEADER-RUDER (Moriyama Mfg. Co., Ltd.); Banbury mixer (Kobe Steel, Ltd.).

Examples of the pulverizer include the following. COUNTER JET MILL, MICRON JET, INNOMIZER (manufactured by Hosokawa Micron Corporation); IDS type mill, PJM jet pulverizer (manufactured by Nippon Pneumatic Mfg. Co., Ltd.); CROSS JET MILL (manufactured by Kurimoto, Ltd.); ULMAX (manufactured by Nisso Engineering Co., Ltd.); SK Jet-O-Mill (manufactured by Seishin Corporation); CRYPTRON (manufactured by Kawasaki Heavy Industries, Ltd.); Turbo Mill (manufactured by Turbo Corp.); Super Rotor (manufactured by Nisshin Engineering Inc.).

Examples of the classifier include the following. CLASSIEL, Micron Classifier, Spedic Classifier (manufactured by Seishin Corporation); Turbo Classifier (manufactured by Nisshin Engineering Co., Ltd.); Micron Separator, TURBOPLEX (ATP), TSP Separator (manufactured by Hosokawa Micron Corporation); Elbow Jet (Nittetsu Mining Co., Ltd.), Dispersion Separator (manufactured by Nippon Pneumatic Mfg. Co., Ltd.); YM MICROCUT (manufactured by Yasukawa Corporation).

Examples of the surface modification device include the following. FACULTY (manufactured by Hosokawa Micron Corporation), MECHANOFUSION (manufactured by Hosokawa Micron Corporation), NOBILTA (manufactured by Hosokawa Micron Corporation), HYBRIDIZER (manufactured by Nara Machinery Co., Ltd.), INNOMIZER (manufactured by Hosokawa Micron Corporation), Theta Composer (manufactured by Tokuju Co., Ltd.), MECHANOMILL (manufactured by Okada Seiko Co., Ltd.).

Examples of the sieving device used for sieving coarse particles include the following. ULTRASONIC (manufactured by Koei Sangyo Co., Ltd.); RESONASIEVE, Gyro-Sifter (manufactured by Tokuju Co., Ltd.); VIBRASONIC SYSTEM (manufactured by Dalton Corporation); SONICLEAN (manufactured by Shintokogio, Ltd.); TURBO-SCREENER (manufactured by Turbo Corp.); MICRO-SIFTER (manufactured by Makino Mfg. Co., Ltd.); circular vibration sieve.

The toner particle comprises a crystalline plasticizer. The crystalline plasticizer is preferably at least one selected from the group consisting of crystalline resins and waxes, and more preferably at least one selected from the group consisting of crystalline polyester resins and waxes. A crystalline plasticizer is defined as a plasticizer having a clear endothermic peak in measurement with a differential scanning calorimeter (DSC).

The crystalline polyester resin will be specifically explained hereinbelow.

The crystalline polyester resin is preferably a polycondensate of an aliphatic diol having from 2 to 20 carbon atoms and a carboxylic acid component. Further, the aliphatic diol is preferably linear. Where the aliphatic diol is linear, the degree of crystallinity of the crystalline polyester resin becomes higher.

Examples of the aliphatic diol include, but are not limited to, the following. In addition, these diols can also be used as a mixture.

Ethylene glycol, 1,4-butanediol, 1,5-pentanediol, 1,6-hexanediol, 1,7-heptanediol, 1,8-octanediol, 1,9-nonanediol, 1,10-decandiol, 1,11-undecanediol, 1,12-dodecanediol, 1,13-tridecanediol, 1,14-tetradecandiol, 1,18-octadecanediol, 1,20-eicosanediol.

Alternatively, an aliphatic diol having a double bond can be used. Examples of the aliphatic diol having the double bond include the following. 2-Butene-1,4-diol, 3-hexene-1,6-diol, and 4-octene-1,8-diol.

Examples of the carboxylic acid component include aromatic dicarboxylic acids and aliphatic dicarboxylic acids. Among them, an aliphatic dicarboxylic acid is preferable, an aliphatic dicarboxylic acid having from 4 to 20 carbon atoms is more preferable, and a linear dicarboxylic acid is particularly preferable from the viewpoint of crystallinity.

Examples of the aliphatic dicarboxylic acid include, but are not limited to, the following. In addition, these dicarboxylic acids can also be used as a mixture.

Oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid, 1,11-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid, 1,18-octadecanedicarboxylic acid, as well as lower alkyl esters thereof and acid anhydrides thereof.

Of these, sebacic acid, adipic acid, 1,10-decanedicarboxylic acid, lower alkyl esters thereof and acid anhydrides thereof are preferable.

Examples of the aromatic dicarboxylic acid include, but are not limited to, the following. Terephthalic acid, isophthalic acid, 2,6-naphthalenedicarboxylic acid, and 4,4'-biphenyldicarboxylic acid.

A dicarboxylic acid having a double bond can also be used. Examples of such dicarboxylic acid include fumaric acid, maleic acid, 3-hexenedioic acid, and 3-octenedioic acid. Other examples include lower alkyl esters and acid anhydrides thereof.

As a carboxylic acid component, a monocarboxylic acid may be used in combination with the dicarboxylic acid. For example, a linear aliphatic monocarboxylic acid having from 8 to 22 carbon atoms can be mentioned.

A method for producing the crystalline polyester resin is not particularly limited, and the crystalline polyester resin can be produced by a general polyester polymerization method in which an acid component and an alcohol component are reacted. For example, a direct polycondensation method or a transesterification method may be used depending on the type of monomers. In the production of the crystalline polyester resin, the polymerization temperature is preferably from 180 to 230° C. Further, if necessary, the pressure inside the reaction system may be reduced, and the reaction may be carried out while removing water and alcohol generated during condensation.

Examples of catalysts that can be used in the production of the crystalline polyester resin include the following. Titanium catalysts such as titanium tetraethoxide, titanium tetrapropoxide, titanium tetraisopropoxide, titanium tetrabutoxide, and tin catalysts such as dibutyltin dichloride, dibutyltin oxide, diphenyltin oxide.

The wax will be specifically explained hereinbelow.

As the wax, for example, the following can be used. Aliphatic hydrocarbon waxes such as low molecular weight polyethylene, low molecular weight polypropylene, microcrystalline wax, paraffin wax, and the like or block copolymers thereof; waxes mainly composed of fatty acid esters such as carnauba wax, Sasol wax, and montanic acid ester wax; partially or completely deoxidized fatty acid esters such as deoxidized carnauba wax; saturated linear fatty acids such as palmitic acid, stearic acid, montanic acid, and the like; unsaturated fatty acids such as brassidic acid, eleostearic acid, parinaric acid, and the like; saturated alcohols such as stearyl alcohol, aralkyl alcohol, behenyl alcohol, carnaubyl alcohol, ceryl alcohol, melissyl alcohol, and the like; long-chain alkyl alcohols; polyhydric alcohols such as sorbitol and the like; fatty acid amides such as linoleic acid amide, oleic acid amide, lauric acid amide, and the like; saturated fatty acid bisamides such as methylene bisstearic acid amide, ethylene biscapric acid amide, ethylene bislauric acid amide, hexamethylene bisstearic acid amide, and the like; unsaturated fatty acid amides such as ethylene bisoleic acid amide, hexamethylene bisoleic acid amide, N,N'-dioleyl adipic acid amide, N,N'-dioleyl sebacic acid amide, and the like; aromatic bisamides such as m-xylene bisstearic acid amide, N,N'-dystearyl isophthalic acid amide, and the like; fatty acid metal salts (generally referred to as metal soaps) such as calcium stearate, calcium laurate, zinc stearate, magnesium stearate, and the like; waxes obtained by grafting a vinyl monomer such as styrene, acrylic acid, and the like onto aliphatic hydrocarbon waxes; partial esterification products of a fatty acid and a polyhydric alcohol such as behenic acid monoglycerides; and methyl ester compounds with a hydroxy group obtained by hydrogenation of vegetable oils and fats.

Of these, aliphatic hydrocarbon waxes are preferable. These may be used alone or in combination of two or more as necessary. Specific examples of the wax include the following.

VISCOL (registered trademark) 330-P, 550-P, 660-P, TS-200 (Sanyo Chemical Industries, Ltd.); HIWAX 400P, 200P, 100P, 410P, 420P, 320P, 220P, 210P, 110P (Mitsui Chemicals, Inc.); SASOL H1, H2, C80, C105, C77 (Sasol Co., Ltd.); HNP-1, HNP-3, HNP-9, HNP-10, HNP-11, HNP-12 (Nippon Seiro Co., Ltd.), UNILIN (registered trademark) 350, 425, 550, 700, UNICID (registered trademark) 350, 425, 550, 700 (Toyo Petrolite Co., Ltd.); wood wax, beeswax, rice wax, candelilla wax, carnauba wax (CERARICA NODA Corporation).

The binder resin will be explained hereinbelow. The binder resin is not particularly limited, and a known resin can be used. The binder resin is preferably an amorphous resin. Specific examples thereof include a polyester resin, a vinyl resin, and a hybrid resin having a vinyl polymer segment and an amorphous polyester segment. A hybrid resin having a vinyl polymer segment and an amorphous polyester segment is preferable.

Examples of the monomers constituting the polyester resin or polyester segment include the following compounds.

Examples of the alcohol component include the following dihydric alcohols. Ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, hydrogenated bisphenol A, and bisphenols represented by a formula (I) and derivatives thereof; and diols represented by a formula (II).

Of these, in terms of obtaining good charging performance and environmental stability, it is preferable that bisphenol represented by the following formula (I) and a derivative thereof be included.

(I)

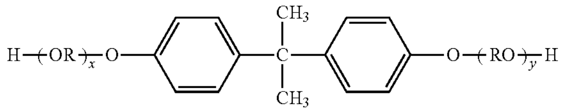

(In the formula, R represents an ethylene group or a propylene group, x and y are each an integer of 0 or more, and the average value of x+y is from 0 to 10.)

(B)

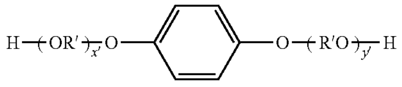

In the formula, R' is $—CH_2CH_2—$, 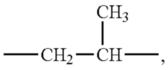, or, 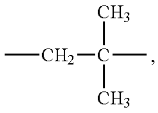, and x' and y' are each an integer equal to or greater than 0, such that the average value of x'+y' is from 0 to 10.

Examples of the acid component include the following divalent carboxylic acids. Benzene dicarboxylic acids and anhydrides thereof, such as phthalic acid, terephthalic acid, isophthalic acid, phthalic anhydride, alkyldicarboxylic acids and anhydrides thereof, such as succinic acid, adipic acid, sebacic acid, azelaic acid, succinic acid substituted having from 6 to 18 carbon atoms alkyl group or alkenyl group, and anhydrides thereof; as well as unsaturated dicarboxylic acids and anhydrides thereof, such as fumaric acid, maleic acid, citraconic acid or itaconic acid.

Examples of trivalent or higher carboxylic acids includes 1,2,4-benzenetricarboxylic acid (trimellitic acid), 1,2,4-cyclohexanetricarboxylic acid, 1,2,4-naphthalenetricarboxylic acid, pyromellitic acid, acid anhydrides thereof or lower alkyl esters thereof. Among the above, aromatic compounds having high stability against environmental changes are preferable, and examples thereof include 1,2,4-benzenetricarboxylic acid and anhydride thereof.

Examples of tri- or higher polyhydric alcohols include 1,2,3-propanetriol, trimethylolpropane, hexanetriol, and pentaerythritol.

Examples of the vinyl-based monomer constituting the vinyl resin or vinyl polymer segment include the following compounds. Styrene; styrene derivatives such as o-methylstyrene, m-methylstyrene, p-methylstyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene; saturated monoolefins such as ethylene, propylene, butylene, and isobutylene; unsaturated polyenes such as butadiene and isoprene; vinyl halides such as vinyl chloride, vinylidene chloride, vinyl bromide, and vinyl fluoride; vinyl esters such as vinyl acetate, vinyl propionate, and vinyl benzoate; α-methylene aliphatic monocarboxylic acid esters such as methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, and diethylaminoethyl methacrylate; acrylic acid esters such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, and phenyl acrylate; vinyl ethers such as vinyl methyl ether, vinyl ethyl ether, and vinyl isobutyl ether; vinyl ketones such as vinyl methyl ketone, vinyl hexyl ketone, and methyl isopropenyl ketone; N-vinyl compounds such as N-vinyl pyrrole, N-vinyl carbazole, N-vinyl indole, and N-vinyl pyrrolidone; vinyl naphthalines; and acrylic acid or methacrylic acid derivatives such as acrylonitrile, methacrylonitrile, and acrylamide.

Furthermore, the following can be mentioned. Unsaturated dibasic acids such as maleic acid, citraconic acid, itaconic acid, alkenyl succinic acid, fumaric acid, and mesaconic acid; unsaturated dibasic acid anhydrides such as maleic acid anhydride, citraconic acid anhydride, itaconic acid anhydride, and alkenyl succinic acid anhydride; half esters of unsaturated dibasic acids such as maleic acid methyl half ester, maleic acid ethyl half ester, maleic acid butyl half ester, citraconic acid methyl half ester, citraconic acid ethyl half ester, citraconic acid butyl half ester, itaconic acid methyl half ester, alkenyl succinic acid methyl half ester, fumaric acid methyl half ester, and mesaconic acid methyl half ester; unsaturated dibasic acid esters such as dimethyl maleic acid and dimethyl fumaric acid; α,β-unsaturated acids such as acrylic acid, methacrylic acid, crotonic acid, and cinnamic acid; α,β-unsaturated acid anhydrides such as crotonic acid anhydride, cinnamic acid anhydride and anhydrides of α,β-unsaturated acids and lower fatty acids; and monomers having a carboxylic group such as alkenyl malonic acid, alkenyl glutaric acid, alkenyl adipic acid, anhydrides thereof, and monoesters thereof.

Other examples include, acrylic acid or methacrylic acid esters such as 2-hydroxyethyl acrylate, 2-hydroxyethyl methacrylate, and 2-hydroxypropyl methacrylate; and monomers having a hydroxy group such as 4-(1-hydroxy-1-methylbutyl) styrene and 4-(1-hydroxy-1-methylhexyl) styrene.

The vinyl resin may have a crosslinked structure crosslinked with a crosslinking agent having two or more vinyl groups. Examples of the crosslinking agent that can be used in this case include the following.

Aromatic divinyl compounds (divinylbenzene and divinylnaphthalene); diacrylate compounds linked by an alkyl chain (ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, and compounds obtained by replacing acrylate of the above compounds with methacrylate); diacrylate compounds linked by an alkyl chain including an ether bond (for example, diethylene glycol diacrylate, triethylene glycol diacrylate, tetraethylene glycol diacrylate, polyethylene glycol #400 diacrylate, polyethylene glycol #600 diacrylate, dipropylene glycol diacrylate, and compounds obtained by replacing acrylate of the above compounds with methacrylate); diacrylate compounds linked by a chain including an aromatic group and an ether bond [polyoxyethylene (2)-2,2-bis(4-hydroxyphenyl)propane diacrylate, polyoxyethylene (4)-2,2-bis(4 hydroxyphenyl)propane diacrylate, and compounds obtained by replacing acrylate of the above compounds with methacrylate]; polyester type diacrylate compounds ("MANDA" manufactured by Nippon Kayaku Co., Ltd.).

Examples of the polyfunctional crosslinking agent include the following. Pentaerythritol triacrylate, trimethylolethane triacrylate, trimethylolpropane triacrylate, tetramethylolmethane tetraacrylate, oligoester acrylate, and compounds obtained by replacing acrylate of the above compounds with methacrylate; triallyl cyanurate and triallyl trimellitate.

Examples of the polymerization initiator that can be used for the polymerization of the vinyl polymer segment include the following. 2,2'-Azobisisobutyronitrile, 2,2'-azobis(4-methoxy-2,4-dimethylvaleronitrile), 2,2'-azobis(2,4-dimethylvaleronitrile), 2,2'-azobis(2-methylbutyronitrile), dimethyl-2,2'-azobisisobutyrate, 1,1'-azobis(1-cyclohexanecarbonitrile), 2-(carbamoylazo)-isobutyronitrile, 2,2'-azobis(2,4,4-trimethylpentane), 2-phenylazo-2,4-dimethyl-4-methoxyvaleronitrile, 2,2-azobis(2-methylpropane), ketone peroxides such as methyl ethyl ketone peroxide, acetylacetone peroxide, and cyclohexanone peroxide, 2,2-bis(tert-butylperoxy)butane, tert-butyl hydroperoxide, cumene hydroperoxide, 1,1,3,3-tetramethylbutyl hydroperoxide, di-tert-butyl peroxide, tert-butylcumyl peroxide, dicumyl peroxide, α,α'-bis(tert-butylperoxyisopropyl)benzene, isobutyl peroxide, octanoyl peroxide, decanoyl peroxide, lauroyl peroxide, 3,5,5-trimethylhexanoyl peroxide, benzoyl peroxide, m-toluyl peroxide, di-isopropyl peroxydicarbonate, di-2-ethylhexyl peroxydicarbonate, di-n-propyl peroxydicarbonate, di-2-ethoxyethyl peroxycarbonate, dimethoxyisopropyl peroxydicarbonate, di(3-methyl-3-methoxybutyl) peroxycarbonate, acetylcyclohexylsulfonyl peroxide, tert-butyl peroxyacetate, tert-butyl peroxyisobutyrate, tert-butyl peroxyneodecanoate, tert-butyl peroxy-2-ethylhexanoate, tert-butyl peroxylaurate, tert-butyl peroxybenzoate, tert-butylperoxyisopropyl carbonate, di-tert-butyl peroxyisophthalate, tert-butylperoxyallyl carbonate, tert-amylperoxy-2-ethylhexanoate, di-tert-butyl peroxyhexahydroterephthalate, di-tert-butyl peroxyazelate.

It is preferable that an external additive such as a flowability improver be externally added to the toner particle to improve the flowability and charging performance of the toner.

The external additive is, for example, fluorine-based resin particles such as vinylidene fluoride fine particles and polytetrafluoroethylene fine powder; inorganic particles such as silica fine particles such as wet silica fine particles or dry silica fine particles, titanium oxide fine particles, and alumina fine particles; hydrophobized fine particles obtained by subjecting the aforementioned fine particles to surface treatment with a hydrophobizing agent such as a silane compound, a titanium coupling agent, silicone oil, and the like; oxides such as zinc oxide and tin oxide; complex oxides such as strontium titanate, barium titanate, calcium titanate, strontium zirconate, and calcium zirconate; carbonate compounds such as calcium carbonate and magnesium carbonate; and the like.

Of these, hydrophobic silica fine particles obtained by hydrophobizing silica fine particles are preferable. The hydrophobizing agent used for the hydrophobizing processing is not particularly limited, and known hydrophobizing agents can be used. For example, silazanes such as hexamethylsilazane and silicone oil such as dimethylsilicone oil can be mentioned.

A method for producing the toner comprising a toner particle comprising a binder resin and a crystalline plasticizer, and an external additive preferably comprises the following steps.

(i) a step of producing the toner particle comprising the binder resin and the crystalline plasticizer, and
(ii) a step of performing a treatment of externally adding an external additive to the toner particle produced in the step (i) by using the toner processing apparatus above.

The toner processing apparatus processes an object to be processed that comprises toner particles. The toner processing apparatus preferably processes an object to be processed that comprises a toner particle and an external additive. It is preferable that the toner processing apparatus processes the object to be processed that comprises the toner particle and the external additive to perform the external addition processing of the external additive to the toner particle. In this case, the external addition processing and the annealing can be performed at the same time. In the toner processing apparatus, the toner obtained by adding the external additive to the toner particle may also be used as the object to be processed.

The temperature of the processing chamber wall surface during processing by the toner processing apparatus may be set, as appropriate, according to the melting point of the crystalline plasticizer to be used, and is not particularly limited, but is preferably from 40 to 60° C., and more preferably from 43 to 50° C.

The processing temperature of the mixing step can be controlled, for example, by allowing water adjusted to a predetermined temperature to flow through the jacket of the mixing device, introducing hot air adjusted to a predetermined temperature into the mixing device, and the like. The temperature inside the tank in the mixing step is measured by installing a temperature sensor in the device. The installation position of the temperature sensor includes the device wall surface, the fixing member in the device, and the like.

The processing time is, for example, preferably about from 1 to 60 min, more preferably about from 5 to 30 min, and even more preferably about from 10 to 20 min. The rotation speed of the rotating member main portion may be changed, as appropriate, according to the size of the apparatus to be used, and is not particularly limited, but is preferably about from 200 to 1500 rpm, and more preferably about from 600 to 1200 rpm.

Examples of the mixing device suitable for external addition to the toner particle that can be used in addition to the toner processing apparatus include the following. FM mixer (manufactured by Nippon Coke Industries Co., Ltd.); SUPER MIXER (manufactured by Kawata Mfg. Co., Ltd.); NOBILTA (manufactured by Hosokawa Micron Corporation), Hybridizer (manufactured by Nara Machinery Co., Ltd.), CYCLOMIX (manufactured by Hosokawa Micron Corporation), and the like.

A method for calculating the degree of crystallinity of the crystalline plasticizer in the toner is described below.

In DSC Q2000 (manufactured by TA Instruments), 5.0 mg of toner is weighed in an aluminum pan, the temperature is raised from 0 to 150° C. for the first time at a temperature rise rate of 10.0° C./min, and the temperature is kept at 150° C. for 5 min. Next, the temperature is lowered to 55° C. at a temperature lowering rate of 10.0° C./min, and the temperature is kept at 55° C. for 10 h.

Next, the temperature is lowered to 0° C. at a temperature lowering rate of 10.0° C./min, and the temperature is kept at 0° C. for 5 min. Then, the temperature is raised from 0 to 150° C. at a temperature rise rate of 10.0° C./min for the second time. The ratio (%) of the endothermic quantity in the first temperature rise to the endothermic quantity in the second temperature rise is defined as the degree of crystallinity of the crystalline plasticizer in the toner.

The melting points of indium and zinc are used for the temperature correction of the device detector, and the heat of fusion of indium is used for the correction of the amount of heat.

EXAMPLES

The present disclosure will be described in more detail below with reference to Examples and Comparative Examples, but the present disclosure is not limited thereto. Parts used in the formulations of Examples are mass-based unless otherwise noted.

Production Example of Toner Particles

Bisphenol A ethylene oxide adduct (2.0 mol addition): 60.0 mol parts
Bisphenol A propylene oxide adduct (2.3 mol addition): 40.0 mol parts
Terephthalic acid: 60.0 mol parts
Trimellitic acid anhydride: 15.0 mol parts
Acrylic acid: 10.0 mol parts The above materials were placed in a four-necked flask, a decompression device, a water separation device, a nitrogen gas introduction device, a temperature measuring device and a stirring device were installed and stirring was performed at 160° C. under a nitrogen atmosphere. A mixture of 30 parts of a vinyl-based polymerization monomer (styrene: 100.0 mol parts) constituting a vinyl polymer segment and 2.0 mol parts of benzoyl peroxide as a polymerization initiator was added dropwise from the dropping funnel over 4 h.

Then, after reacting at 160° C. for 5 h, the temperature was raised to 230° C., 0.2% by mass of dibutyl tin oxide was added, and the reaction time was adjusted so as to obtain the desired viscosity. After completion of the reaction, the reaction product was taken out from the container, cooled and pulverized to obtain a hybrid resin (A-1) of a polyester and a styrene polymer. The glass transition temperature (Tg) of the hybrid resin (A-1) was 61.8° C., and the softening temperature (Tm) was 136.2° C.

Ethylene glycol: 100.0 mol parts
Adipic acid: 90.0 mol parts
Lauric acid: 20.0 mol parts The above monomers and 0.2% by mass of dibutyltin oxide with respect to the total amount of the monomers were placed in a 10 L four-necked flask equipped with a nitrogen introduction tube, a dehydration tube, a stirrer and a thermocouple, and a reaction was carried out at 180° C. for 4 h. Then, the temperature was raised to 210° C. at 10° C./1 h, the temperature was kept at 210° C. for 8 h, and then the reaction was carried out at 8.3 kPa for 1 h to obtain a crystalline polyester (C-1).

Hybrid resin (A-1): 100.0 parts
Crystalline polyester (C-1): 25.0 parts
C. I. Pigment Blue 15:3: 7.0 parts
Release agent (C105 (manufactured by Sasol Co., Ltd.)): 2.0 parts
Charge control agent (T-77, manufactured by Hodogaya Chemical Co., Ltd.): 1.0 part The above materials were premixed with FM mixer and then melt-kneaded at a set temperature of 120° C. using a twin-screw kneading extruder (PCM-30 type, manufactured by Ikegai Co., Ltd.). After that, the coarsely pulverized material was pulverized with a mechanical pulverizer (T-250, manufactured by Turbo Corp), and the obtained finely pulverized powder was classified using a multi-division classifier utilizing the Coanda effect to obtain toner particles 1 having a weight averaged particle size (D4) of 7.8 μm.

Production Example of External Additive

Silica powder obtained by a vapor-phase method and having a number average particle size of primary particles of 18 nm and a BET specific surface area of 200 $m^2/g$ was placed in a reaction vessel and stirred under a nitrogen atmosphere. In this process, 5 g of hexamethylsilazane was sprayed on 100 g of the silica powder, and stirring was performed for 30 min at an ambient temperature of 200° C. After stirring, 15 g of dimethyl silicone oil was further sprayed, followed by heating and stirring at 200° C. for 60 min. Then cooling to 25° C. was performed to prepare surface-treated silica particles.

Example 1

The specific configuration of the toner processing apparatus 1 in Example 1 will be described in more detail with reference to FIG. 1 mentioned hereinabove.

The processing chamber 10 is a cylindrical container having an inner height of 250 mm, an inner diameter of φ230 mm (the radius d of the inner circumference of the processing chamber is 115 mm), and an effective capacity of 10 L as shown in FIG. 1. The drive shaft 11 is provided in the center of the flat bottom of the processing chamber. The drive of the drive motor 50 is transmitted to the drive shaft 11 via the drive belt. The control unit 60 includes a power switch, a drive ON switch, a drive stop switch, a rotation speed adjustment volume, a rotation speed display unit, a product temperature display unit, and the like and controls the operation of the toner processing apparatus 1.

As described above, inside the processing chamber 10, a flow means 20 for causing the object to be processed to flow upward from the bottom of the processing chamber 10 is attached to the drive shaft 11. The S-shaped flow means 20 having flip-up tips is used. Further, above the flow means 20, the rotating member 30 shown in FIGS. 4A and 4B is attached to the same drive shaft 11. The rotating member 30 is provided with two processing portions 32 protruding radially outward from the outer peripheral portion 31*a* of the annular rotating member main portion 31.

As described above, in the toner processing apparatus 1 shown in FIG. 1, the effective capacity of the processing chamber 10 shown in FIG. 2 for accommodating the object to be processed is 10 L. The flow means 20 shown in FIGS. 3A and 3B is installed as a lifting means for lifting the object to be processed upward from the bottom of the processing chamber 10.

The processing portion 32 has the plate-shaped processing surface 33 in which a part or the whole collides with the object to be processed to process the object, and the rear wing 34 joined to the upstream side of the plate-shaped processing surface 33 in the rotation direction. The plate-shaped processing surface 33 protrudes upward from the rear wing 34. As shown in the figure, the plate-shaped processing surface 33 is a rectangular flat surface.

Further, the plate-shaped processing surface 33 has an angle θ shown in FIG. 9 of 100°. Where the radius of the inner circumference of the processing chamber is denoted by d, the shortest distance between the inner wall 35 of the processing chamber and the plate-shaped processing surface 33 is 0.035d. The rear wing 34 has a curvature protruding toward the inner wall of the processing chamber. The length of the plate-shaped processing surface 33 in the direction perpendicular to the drive shaft 11 of the rotating member 30 is 0.29d, and the region of the plate-shaped processing surface 33 farthest from the rotating member main portion 31 has a length of 0.20d in the direction of the drive shaft 11 of the rotating member 30.

Where the angle θ exceeds 90° C., it is determined that "a region of the plate-shaped processing surface away from the rotating member main portion is located on the downstream side in the rotation direction of the rotating member with respect to a region that is closer to the rotating member main portion than the aforementioned region".

A total of 100 parts of toner particles 1 was introduced into the toner processing apparatus 1 having the above configuration for 10% of the effective capacity of the processing chamber 10. Furthermore, 1.0 part of surface-treated silica particles was introduced.

Next, the rotation speed of the rotating member main portion 31 was controlled to be 800 rpm, and external addition processing was performed by operating for 15 min to obtain toner 1. In this case, at the same time as the start of mixing, hot water and cold water were passed, as appropriate, through the jacket to keep the temperature in the tank at 45° C.

Table 1-2 shows the results of evaluating the degree of crystallinity of the obtained toner and the heat-resistant storage stability of the toner by the following methods.

Evaluation of Heat-Resistant Storage Stability

Approximately 10 g of toner 1 is placed in a 100 mL resin cup, allowed to stand in an environment with a temperature of 45° C. and a humidity of 95% for 7 days, and then visually evaluated.

Evaluation Criteria

A: No aggregates are seen.

B: Aggregates can be seen, but they easily crumble.

C: Aggregates can be seen, but they crumble when shaken.

D: The aggregates can be grasped and do not easily crumble.

TABLE 1-1

| | Toner processing apparatus No. | Flow means | Rear wing | Area of rear wing | Protrusion | Protrusion length | Angle θ [°] | A | Curvature of rear wing | B | C |
|---|---|---|---|---|---|---|---|---|---|---|---|
| Example 1 | 1 | Present | Present | 0.072 d^2 | Present | 0.100 d | 100 | 0.035 d | Present | 0.29 d | 0.20 d |
| Example 2 | 2 | Present | Present | 0.072 d^2 | Present | 0.170 d | 100 | 0.035 d | Present | 0.29 d | 0.34 d |
| Example 3 | 3 | Present | Present | 0.072 d^2 | Present | 0.080 d | 100 | 0.035 d | Present | 0.29 d | 0.16 d |
| Example 4 | 4 | Present | Present | 0.126 d^2 | Present | 0.195 d | 100 | 0.035 d | Present | 0.38 d | 0.39 d |
| Example 5 | 5 | Present | Present | 0.042 d^2 | Present | 0.055 d | 100 | 0.035 d | Present | 0.22 d | 0.11 d |
| Example 6 | 6 | Present | Present | 0.209 d^2 | Present | 0.205 d | 100 | 0.035 d | Present | 0.49 d | 0.41 d |
| Example 7 | 7 | Present | Present | 0.011 d^2 | Present | 0.045 d | 100 | 0.035 d | Present | 0.11 d | 0.09 d |
| Example 8 | 8 | Present | Present | 0.227 d^2 | Present | 0.205 d | 100 | 0.035 d | Present | 0.51 d | 0.41 d |
| Example 9 | 9 | Present | Present | 0.007 d^2 | Present | 0.205 d | 100 | 0.035 d | Present | 0.09 d | 0.41 d |

TABLE 1-1-continued

| | Toner processing apparatus No. | Flow means | Rear wing | Area of rear wing | Protrusion | Protrusion length | Angle θ [°] | A | Curvature of rear wing | B | C |
|---|---|---|---|---|---|---|---|---|---|---|---|
| Example 10 | 10 | Present | Present | 0.307 dˆ2 | Present | 0.205 d | 100 | 0.035 d | Absent | 0.51 d | 0.41 d |
| Example 11 | 11 | Present | Present | 0.307 dˆ2 | Present | 0.205 d | 100 | 0.065 d | Absent | 0.51 d | 0.41 d |
| Example 12 | 12 | Present | Present | 0.307 dˆ2 | Present | 0.205 d | 100 | 0.095 d | Absent | 0.51 d | 0.41 d |
| Example 13 | 13 | Present | Present | 0.276 dˆ2 | Present | 0.205 d | 118 | 0.095 d | Absent | 0.51 d | 0.41 d |
| Example 14 | 14 | Present | Present | 0.309 dˆ2 | Present | 0.205 d | 98 | 0.095 d | Absent | 0.51 d | 0.41 d |
| Example 15 | 15 | Present | Present | 0.246 dˆ2 | Present | 0.205 d | 128 | 0.095 d | Absent | 0.51 d | 0.41 d |
| Example 16 | 16 | Present | Present | 0.312 dˆ2 | Present | 0.205 d | 92 | 0.095 d | Absent | 0.51 d | 0.41 d |
| Example 17 | 17 | Present | Present | 0.312 dˆ2 | Present | 0.040 d | 92 | 0.095 d | Absent | 0.51 d | 0.41 d |
| Example 18 | 18 | Present | Present | 0.005 dˆ2 | Present | 0.040 d | 92 | 0.095 d | Absent | 0.51 d | 0.41 d |
| Example 19 | 19 | Present | Present | 0.320 dˆ2 | Present | 0.040 d | 92 | 0.095 d | Absent | 0.51 d | 0.41 d |
| Example 20 | 20 | Present | Present | 0.297 dˆ2 | Present | 0.205 d | 131 | 0.095 d | Absent | 0.51 d | 0.41 d |
| C.E. 1 | 21 | Present | Present | 0.209 dˆ2 | Present | 0.205 d | 92 | 0.105 d | Absent | 0.51 d | 0.41 d |
| C.E. 2 | 22 | Present | Present | 0.202 dˆ2 | Present | 0.205 d | 89 | 0.095 d | Absent | 0.51 d | 0.41 d |
| C.E. 3 | 23 | Present | Present | 0.072 dˆ2 | Absent | 0.000 d | 100 | 0.035 d | Present | 0.29 d | 0.08 d |
| C.E. 4 | 24 | Present | Absent | 0.066 dˆ2 | Absent | — | 92 | 0.095 d | Absent | 0.29 d | 0.20 d |
| C.E. 5 | 25 | Absent | Present | 0.046 dˆ2 | Present | 0.000 d | 85 | 0.105 d | Present | 0.25 d | 0.08 d |
| C.E. 6 | 26 | Present | Present | 0.046 dˆ2 | Present | 0.050 d | 85 | 0.105 d | Present | 0.25 d | 0.10 d |

TABLE 1-2

| | Degree of crystallinity | Heat-resistant storage stability | Toner fusion |
|---|---|---|---|
| Example 1 | 98.0% | A | Does not occur |
| Example 2 | 98.5% | A | Does not occur |
| Example 3 | 98.2% | A | Does not occur |
| Example 4 | 96.5% | A | Does not occur |
| Example 5 | 95.5% | A | Does not occur |
| Example 6 | 94.6% | A | Does not occur |
| Example 7 | 94.2% | A | Does not occur |
| Example 8 | 92.3% | A | Does not occur |
| Example 9 | 92.7% | A | Does not occur |
| Example 10 | 90.0% | A | Does not occur |
| Example 11 | 90.3% | A | Does not occur |
| Example 12 | 88.1% | B | Does not occur |
| Example 13 | 88.4% | B | Does not occur |
| Example 14 | 87.6% | B | Does not occur |
| Example 15 | 86.2% | C | Does not occur |
| Example 16 | 86.1% | C | Does not occur |
| Example 17 | 76.2% | C | Does not occur |
| Example 18 | 71.5% | C | Does not occur |
| Example 19 | 71.1% | C | Does not occur |
| Example 20 | 70.8% | C | Does not occur |
| C.E. 1 | 61.8% | D | Does not occur |
| C.E. 2 | 65.5% | D | Does not occur |
| C.E. 3 | 15.2% | D | Occurs |
| C.E. 4 | 62.3% | D | Occurs |
| C.E. 5 | 35.2% | D | Does not occur |
| C.E. 6 | 46.7% | D | Does not occur |

In the table, "Flow means" indicates the presence/absence of a flow means for causing the object to be processed to flow upward from the bottom of the processing chamber. "Rear wing" indicates the presence/absence of a rear wing joined to the upstream side of the plate-shaped processing surface in the rotation direction. "Protrusion" indicates the presence/absence of protrusion of the plate-shaped processing surface above the rear wing. A indicates the shortest distance between the inner wall of the processing chamber and the plate-shaped member, B indicates the length of the plate-shaped processing surface in the direction perpendicular to the drive shaft of the rotating member, and C indicates the length of the region of the plate-shaped processing surface farthest from the rotating member main portion in the drive shaft direction of the rotating member. Toner fusion indicates whether the toner fuses at the plate-shaped processing surface. C.E. indicates Comparative Example.

In the table, the description such as 0.072dˆ2 indicates 0.072$d^2$.

Examples 2 To 20, Comparative Examples 1 To 6

The toner particles 1 were processed and evaluated in the same manner as in Example 1 except that the configuration of the toner processing apparatus was changed to those of toner processing apparatuses 2 to 26 in Table 1-1. Table 1-2 shows the evaluation results of Examples 2 to 20 and Comparative Examples 1 to 6.

The rear wing without curvature has a rhombic shape with the front edge of the plate-shaped processing surface 33 and the straight line b in FIGS. 8A and 8B as sides.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2021-138480, filed Aug. 27, 2021, which is hereby incorporated by reference herein in its entirety.

What is claimed is:

1. A toner processing apparatus for processing an object to be processed comprising toner particles, the toner processing apparatus comprising:

a processing chamber having a bottom and a cylindrical inner peripheral surface in which the object to be processed is accommodated;

a drive shaft rotatably provided at the bottom of the processing chamber;

a rotating member pivotally supported by the drive shaft; and a flow means pivotally supported by the drive shaft and arranged below the rotating member in the processing chamber for causing the object to be processed to flow upward from the bottom of the processing chamber, wherein the rotating member includes:

a rotating member main portion, and a processing portion protruding outward in the radial direction from an outer peripheral portion of the rotating member main portion, the processing portion including:

a plate-shaped processing surface that partially or wholly collides with the object to be processed, the plate-shaped processing surface extending from the outer peripheral portion of the rotating member main portion to the cylindrical inner peripheral surface of the processing chamber with a gap between the plate-shaped processing surface and the cylindrical inner peripheral surface of the processing chamber such that the shortest distance between the cylindrical inner peripheral surface of the processing chamber and the plate-shaped processing surface is 0.100d or less, where a radius of an inner circumference of the processing chamber is denoted by d; and a rear wing coupled to the upstream side of the plate-shaped processing surface in a rotation direction, the plate-shaped processing surface protruding upward and downward from the rear wing;

a region of the plate-shaped processing surface away from the rotating member main portion is located on the downstream side in the rotation direction of the rotating member compared to a region close to the rotating member main portion.

2. The toner processing apparatus according to claim 1, wherein the rear wing has a shape having a curvature protruding toward the inner wall of the processing chamber.

3. The toner processing apparatus according to claim 1, wherein the plate-shaped processing surface has a length of 0.10d to 0.50d in a direction perpendicular to an axial direction of the drive shaft of the rotating member.

4. The toner processing apparatus according to claim 1, wherein a portion of the plate-shaped processing surface farthest from the rotating member main portion has a length of 0.10d to 0.40d in the axial direction of the drive shaft of the rotating member.

5. The toner processing apparatus according to claim 1, wherein where the radius of the inner circumference of the processing chamber is denoted by d, the rear wing has the maximum area of $0.007d^2$ to $0.312d^2$ in the direction perpendicular to the drive shaft.

6. The toner processing apparatus according to claim 1, wherein where the radius of the inner circumference of the processing chamber is denoted by d, the plate-shaped processing surface from the rear wing has an upward protrusion length of 0.043d or more.

7. The toner processing apparatus according to claim 1, wherein an end portion of the plate-shaped processing surface on the inner wall side of the processing chamber has a shape parallel to the axial direction of the drive shaft.

8. The toner processing apparatus according to claim 1, wherein the plate-shaped processing surface is a flat surface.

9. The toner processing apparatus according to claim 1, wherein where a straight line passing through the drive shaft and a point where the plate-shaped processing surface is in contact with the outer peripheral portion of the rotating member main portion is defined as a straight line a;

a straight line passing through the point where the plate-shaped processing surface is in contact with the outer peripheral portion of the rotating member main portion and perpendicular to the straight line a is defined as a straight line b; and an angle formed by the straight line b and the plate-shaped processing surface is defined as θ, the θ is larger than 90° and not more than 130°.

10. A method for producing a toner comprising a toner particle comprising a binder resin and a crystalline plasticizer, and an external additive, the method comprising:

(i) a step of producing the toner particle comprising the binder resin and the crystalline plasticizer, and (ii) a step of performing a treatment of externally adding an external additive to the toner particle produced in the step (i) by using the toner processing apparatus of claim 1.

* * * * *